US006643410B1

(12) United States Patent
Yu et al.

(10) Patent No.: US 6,643,410 B1
(45) Date of Patent: Nov. 4, 2003

(54) METHOD OF DETERMINING THE EXTENT OF BLOCKING ARTIFACTS IN A DIGITAL IMAGE

(75) Inventors: Qing Yu, Rochester, NY (US); Jiebo Luo, Rochester, NY (US); Rajan L. Joshi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 656 days.

(21) Appl. No.: 09/606,266

(22) Filed: Jun. 29, 2000

(51) Int. Cl.$^7$ ................................................ G06K 9/00
(52) U.S. Cl. ....................... 382/268; 382/190; 382/194; 382/199; 382/220; 382/243; 382/250; 382/272; 382/273; 382/274; 382/275; 348/252; 358/1.9
(58) Field of Search ................................. 382/268, 250, 382/266, 251, 199, 194, 190, 267, 200, 220, 263, 243, 254, 272, 273, 274, 275; 348/606–624, 252; 358/1.9, 3.31, 447, 461, 463

(56) References Cited

U.S. PATENT DOCUMENTS

| | | | | |
|---|---|---|---|---|
| 5,682,440 A | * | 10/1997 | Yukawa ...................... 382/205 |
| 5,774,101 A | * | 6/1998 | Hirai et al. ..................... 345/89 |
| 5,793,428 A | * | 8/1998 | Coelho .................. 375/240.13 |
| 5,867,221 A | * | 2/1999 | Pullen et al. ........... 375/240.16 |
| 5,949,919 A | * | 9/1999 | Chen .......................... 382/276 |
| 5,956,430 A | * | 9/1999 | Kunitake et al. ............ 382/246 |
| 6,058,209 A | * | 5/2000 | Vaidyanathan et al. ..... 382/203 |
| 6,411,741 B1 | * | 6/2002 | Hamamura et al. ......... 382/254 |
| 6,512,855 B1 | * | 1/2003 | Delean ........................ 382/276 |
| 6,532,306 B1 | * | 3/2003 | Boon et al. ................. 382/232 |
| 6,563,537 B1 | * | 5/2003 | Kawamura et al. ......... 348/252 |
| 2001/0036314 A1 | * | 11/2001 | Yamaguchi et al. ........ 382/172 |
| 2002/0044689 A1 | * | 4/2002 | Roustaei et al. ............ 382/199 |

FOREIGN PATENT DOCUMENTS

| | | | |
|---|---|---|---|
| EP | 0 986 270 a2 | 3/2000 | .......... H04N/17/00 |
| EP | 1 001 608 A2 | 5/2000 | ............ H04N/1/40 |

OTHER PUBLICATIONS

"Measuring blocking artefacts using harmonic analysis" by K.T. Tan and M. Ghanbari. Electronic Letters, Aug. 5, 1999, vol. 35, No. 16.
"Reduction of Blocking Effect in Image Coding" by Howard C. Reeve III and Jae S. Lim. ICASSP, pp. 1212–1215, 1983.

* cited by examiner

Primary Examiner—Bhavesh M. Mehta
Assistant Examiner—Barry Choobin
(74) Attorney, Agent, or Firm—David M. Woods

(57) ABSTRACT

A digital image processing method determines the extent of blocking artifacts in a digital image by first forming a column difference image and averaging the values in the columns in the column difference image to produce a column difference array. The average of the values in the column difference array that are separated by one block width are computed to produce a block averaged column difference array. Then, the peak value in the block averaged column difference array is located, and the mean value of the block averaged column difference array (excluding the peak value) is calculated to produce a column base value, and the ratio between the peak value and the base value are computed to produce a column ratio. The foregoing steps are repeated in the row direction to produce a row ratio. Finally, the column and row ratios are employed as a measure of the extent of blocking artifacts in the digital image.

9 Claims, 2 Drawing Sheets

METHOD OF DETERMINING THE EXTENT OF BLOCKING ARTIFACTS IN A DIGITAL IMAGE

FIELD OF THE INVENTION

This invention relates to the field of digital image processing, and more particularly to methods of determining the extent of blocking artifacts in a digital image.

BACKGROUND OF THE INVENTION

Digital images contain enormous amounts of data. Storage of such data on digital media is generally expensive, and the transmission of digital images requires either a large bandwidth or a long period of time. Many algorithms have been developed to compress image data by removing visually redundant information from the image. Discrete-cosine-transform-based (DCT-based) compression has been the most popular among existing techniques. The DCT has very good energy compaction and data decorrelation properties. Moreover, the DCT can be computed using fast algorithms and efficiently implemented using very large scale integration (VLSI) techniques. In DCT-based coding, an image is partitioned into small square blocks (typically 8×8) and the DCT is computed over these blocks to remove the local spatial correlation. In order to achieve high compression, quantization of the DCT coefficients is then performed. Quantization is an irreversible process that causes loss of information and distortions in the decompressed image. After quantization, the redundancy in the data is further reduced using entropy coding. At the decoder end, the received data is decoded, dequantized, and reconstructed by the inverse DCT. In general, a typical 8-bit gray-level image can be coded with a compression ratio of up to 10:1 without noticeable artifacts.

However, at low bit rates the reconstructed images generally suffer from visually annoying artifacts as a result of very coarse quantization. One major artifact is the blocking effect, which appears as artificial block boundaries between adjacent blocks. At a low bit rate, each block is represented mainly by the first few low-frequency coefficients and, since each block is processed independently, no interblock correlation is accounted for in standard block DCT-based coding schemes. Therefore, discontinuity across the block boundary becomes noticeable.

There are many techniques developed to reduce the blocking effect. (e.g., H. C. Reeve III and J. S. Lim, "Reduction of blocking effect in image coding," *ICASSP*, pp. 1212–1215, 1983). Since most of these techniques employ some kind of image filtering technique and thus reduce image sharpness to some extent, it is imperative that these techniques not be used on a "good image," i.e., one that has not been compressed highly enough to exhibit the blocking artifacts. Therefore, it is necessary to develop a triage algorithm that measures the extent of blocking artifacts in a digital image.

Certain blocking artifact removal algorithms require prior knowledge of block boundary locations. However, since digital images compressed with a DCT-based technique can be further modified, for example, through cropping and zooming, the block boundary locations may have changed and become unknown at the time of blocking artifact removal. Thus, for those blocking artifact removal algorithms, there is a need for an automatic technique for detecting block boundary locations in digital images having blocking artifacts.

Because digital images may or may not have been compressed, and may have gone through different degrees of compression, the extent of the blocking artifacts varies from nonexistent to visually objectionable. Therefore, There is a need for determining the extent of the blocking artifacts in order to decide whether to perform artifact removing procedures. Furthermore, because virtually all artifact removal algorithms remove blocking artifacts at the expense of image detail, there is a need for controlling the optimal amount of filtering in order to strive for a good trade-off between artifact removal and image detail preservation.

A conventional method for determining the extent of the blocking artifacts involves taking the ratio between the size of the compressed JPEG file and the size of the image, which corresponds to the amount of uncompressed image data. This ratio is commonly referred to as the compression ratio. However, the compression ratio is not necessarily a good measure of the quality of the compressed image, nor the extent of the blocking artifacts. In general, at the same compression ratio, a busy image would look worse than a less busy image because busy images are harder to compress (therefore a busy image has lost more details than the less busy image). Therefore, there is a need to define a more perceptually accurate measure of the blocking artifacts.

SUMMARY OF THE INVENTION

The present invention is directed to overcoming one or more of the problems set forth above. Briefly summarized, according to one aspect of the present invention, a digital image processing method for determining the extent of blocking artifacts in a digital image, includes the steps of: forming a column difference image; averaging the values in the columns in the column difference image to produce a column difference array; computing the average of the values in the column difference array that are separated by one block width to produce a block averaged column difference array; locating the peak value in the block averaged column difference array; calculating the mean value of the block averaged column difference array excluding the peak value to produce a column base value; computing the ratio between the peak value and the base value to produce a column ratio; repeating the above-mentioned steps in the row direction to produce a row ratio; and employing the column and row ratios as a measure of the extent of blocking artifacts in the digital image.

ADVANTAGES

The present invention has the advantage that it measures the extent of blocking artifacts in a digital image based on image content. The present invention also has the advantage that it automatically detects block boundary locations even if a digital image has been modified by cropping and zooming.

DETAILED DESCRIPTION OF THE INVENTION

In the following description, a preferred embodiment of the present invention will be described as an image processing method that would ordinarily be embodied as a software program. Those skilled in the art will readily recognize that the equivalent of such software may also be constructed in hardware. Because image manipulation algorithms and systems for running such algorithms are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art. Given the method as described according to the invention in the following materials, software not specifically shown, described or suggested herein that is useful for implementation of the invention is conventional and within the ordinary skill in such arts.

Furthermore, as used herein, the computer program may be stored in a computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

The present invention relates to a method for determining the extent of blocking artifacts in a digital image. The digital image may be a grayscale image containing the intensity component, or a color image containing RGB components. For color images, a color transform is typically performed before image compression to take advantage of the redundancy in the color perception of the human visual system (HVS). For example, in JPEG compression, a color image is first converted from RGB to YCbCr color space with the following equations:

$$Y=16+65.481 *R+128.553*G+24.966*B;$$

$$Cb=128-37.797*R-74.203*G+112*B;$$

$$Cr=128+112*R-93.786*G-18.214*B;$$

where Y is the intensity component, and Cb and Cr are the two chrominance components. R, G and B are all normalized to 1.

Figure 1:
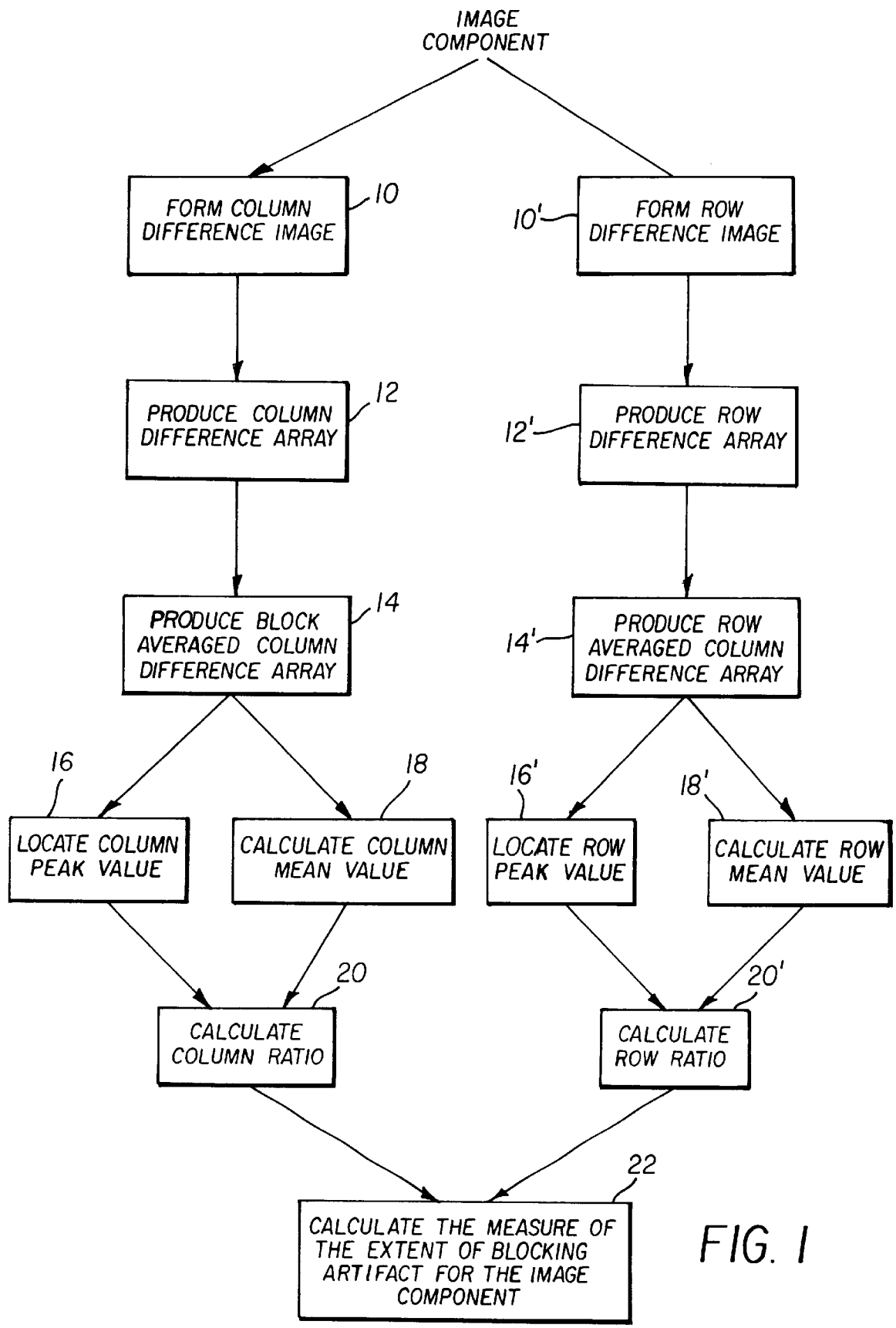
FIG. 1 is a block diagram of an embodiment of current invention.

Referring to FIG. 1, for each image component, a column difference image is first generated in step 10 by calculating the absolute difference between two adjacent columns. For example, the column difference image is generated by subtracting the pixel values of the second column of the image from the pixel values of the first column of the image to generate a column of difference values, and then setting the pixel values of the first column of the column difference image as the absolute values of the column of difference values. The same procedure is repeated to set the rest of the columns of the column difference image except for the last column, where all the values of that column are set to zero.

The column difference image is further averaged in the vertical direction to generate a one-dimensional column difference array VA in a step 12. Assuming that the original image has M rows and N columns of image data, the column difference array VA should have N entries. To keep image edges from contributing to the detection, the contribution of a pixel in the column difference image is discarded if the magnitude of the intensity gradient of the corresponding pixel in the original image component is larger than a threshold value T. Sobel operators are used as the intensity gradient operators to generate an intensity gradient image with the intensity gradient equal to the sum of the absolute values from the horizontal and vertical Sobel operators. In the current embodiment of the invention, the standard deviation (SD) of the intensity gradient image is calculated, and the threshold value T is set as twice the standard deviation SD.

The column difference array VA is further averaged using a periodicity of the JPEG block width (8) in a step 14 to generate a block averaged column difference array VAA, which has eight entries. In other words, every eighth entry of the column difference array VA will be averaged, and the result will be used to set the eight entries of the block averaged column difference array VAA.

From the block averaged column difference array VAA, the maximum value is first located in a step 16 and defined as the column peak value, then the mean value of the block averaged column difference array VAA is calculated in a step 18 excluding the peak value. The mean value is defined as the column base value. Finally, the ratio between the column peak value and the column base value is calculated in a step 20 to generate a column ratio.

Figure 2:
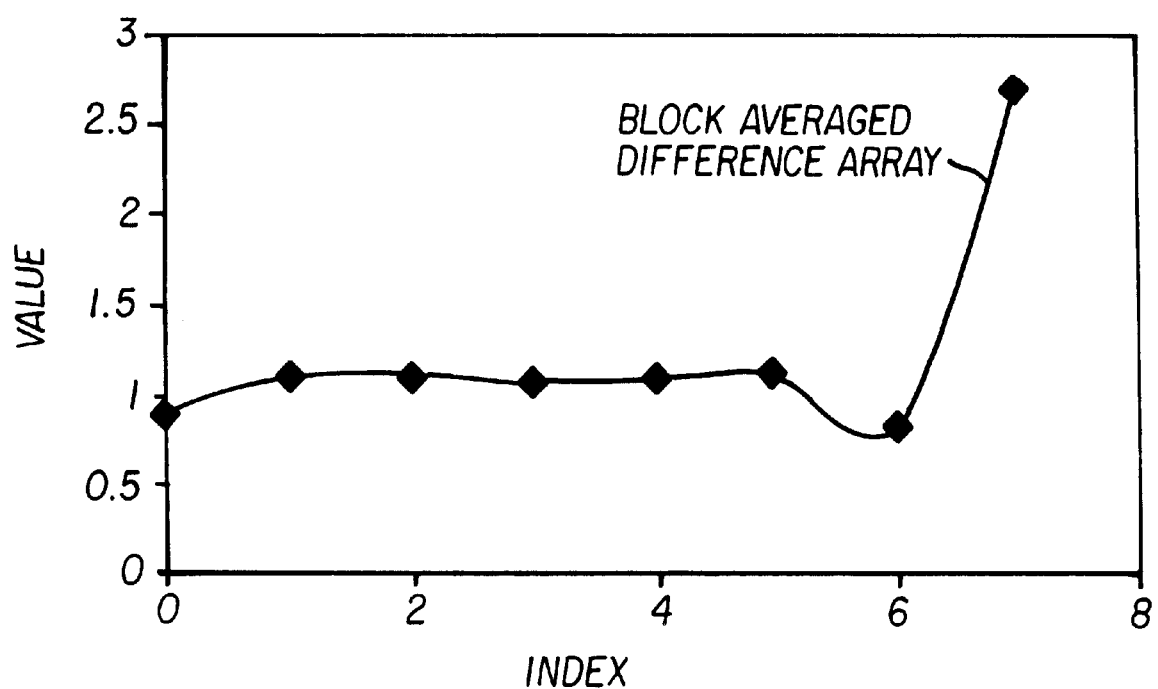
FIG. 2 shows a plot of a typical block averaged difference array.

FIG. 2 shows a typical block averaged difference array with 8 elements (index starts at 0) from a typical digital image. The x-axis is the array index and the y-axis is magnitude. In this case, the peak value (2.62) occurs at index 7, the mean value is 1.03, and the ratio is about 2.6.

Referring to FIG. 1, the row peak value, row base value and row ratio are also calculated analogously in the series of steps 10'–20', where the common reference numerals indicate that the respective operations performed on the rows are analogous to the operations performed on the columns. More specifically, a row difference array HA and a block averaged row difference array HAA are generated in the block 12' and 14', respectively, and similar measures based on these arrays are developed in the blocks 16'–20'.

The column and row ratios are good indicators of the presence of the blocking artifacts in the column and row directions, respectively. Therefore, a preferred measure (calculated in a step 22) for the extent of blocking artifacts is the average values of the column and row ratios for images with statistically equally distributed horizontal and vertical structures. A more aggressive measure is the minimum value of the column and row ratios. If the measure exceeds a predetermined threshold, a conventional artifact-removing algorithm is triggered, such as the algorithm described in the aforementioned Reeve and Lim article. Based on a study of human subject responses, a preferred threshold value is determined as 2.0.

The visibility or objectionability of the blocking artifacts may depend on the actual structure in an image. For example, textured areas tend to hide the blocking artifacts better than flat areas. The column and row base values are good indicators of the amount of textures. To achieve a higher degree of adaptivity to the image content, the measure of the extent of the blocking artifacts can be defined as a function of both the column/row ratios and the column/row base values. In general, the higher the base values, meaning a higher degree of texture activity (capable of hiding a larger extent of blocking artifacts), a higher threshold on the artifact measure should be used. In practice, a look-up-table can be built to quantitatively characterize the relationship between the base values and the threshold.

If the measure for the extent of blocking artifacts exceeds a predetermined threshold, the artifact-removing algorithm is triggered. The indexes of peak value in the block averaged column difference array VAA and the block averaged row difference array HAA are the JPEG block boundary locations in the horizontal and vertical directions for the image component. For example, if the index for the peak value in the block averaged column difference array VAA is 4, then it is assumed that JPEG block boundary will appear at column no. 4, 12, . . . , in the image component. Note that the indexes for the columns of the image component as well as for the block averaged column difference array VAA and the block averaged row difference array HAA start at zero in this embodiment.

In the case where digital images are not only cropped but also zoomed (shrunk or magnified), the block size is no longer the original JPEG block size of 8. For potentially magnified digital images, the above-mentioned process for determining the extent of the JPEG blocking artifacts can be repeated for a predetermined series of hypothetical block width values to produce a series of ratios between the peak value and the base value. The hypothetical block width that produces the maximum artifact measure is chosen to be the effective block size after zooming. The zooming factor is in turn determined to be the ratio between the effective block size and the original block size (i.e., 8).

The invention has been described with reference to a preferred embodiment. However, it will be appreciated that variations and modifications can be effected by a person of ordinary skill in the art without departing from the scope of the invention.

PARTS LIST 10 step of forming a column difference image
12 step of producing a column difference array
14 step of producing a block averaged column difference array
16 step of locating a column peak value
18 step of calculating a column mean value
20 step of calculating a column ratio
10' step of forming a row difference image
12' step of producing a row difference array
14' step of producing a block averaged row difference array
16' step of locating a row peak value
18' step of calculating a row mean value
20' step of calculating a row ratio
22 step of calculating the measure of the extent of blocking artifact for the image component

What is claimed is:

1. A method of determining the extent of blocking artifacts in a digital image formed of rows and columns of pixels, comprising the steps of:
   a) forming a column difference image from the difference between columns in the digital image;
   b) averaging the values in the columns in the column difference image to produce a column difference array;
   c) computing the average of the values in the column difference array that are separated by one block width to produce a block averaged column difference array;
   d) locating a peak value in the block averaged column difference array;
   e) calculating a mean value of the block averaged column difference array excluding the peak value to produce a column base value;
   f) computing the ratio between the peak value and the column base value to produce a column ratio;
   g) repeating steps a)–f) in the row direction to produce a row ratio; and;
   h) employing the column and row ratios as a measure of the extent of blocking artifacts in the digital image.

2. The method as claimed in claim 1, further comprising the steps of:
   a) generating an intensity gradient image from the digital image;
   b) calculating the standard deviation of the gradient image;
   c) setting a threshold value that is twice the standard deviation; and
   d) in computing the average of the values in the column and row difference arrays, excluding pixels whose gradients are larger than the threshold value.

3. The method as claimed in claim 1, wherein the measure of the extent of blocking artifacts is the average of the column and row ratios.

4. The method as claimed in claim 1, wherein the measure of the extent of blocking artifacts is a function of the column and row ratios and the column and row base values.

5. The method as claimed in claim 1, wherein the measure of the extent of blocking artifacts is a look-up-table of the column and row ratios and the column and row base values.

6. The method as claimed in claim 1, further comprising the steps of:
   a) if the measure of the extent of blocking artifacts exceeds a predetermined threshold, determining the location of the row and column block boundaries as the locations of the column and row peak values; and
   b) applying a blocking artifact removal algorithm to the image according to the location and extent of the blocking artifacts.

7. The method as claimed in claim 1, for potentially magnified digital images, further comprising the steps of:
   a) computing the average of the values in the column difference array that are separated by a hypothetical block width to produce a block averaged column difference array;
   b) repeating steps d)–h) in claim 1 for a predetermined series of hypothetical block width values to produce a series of ratios between the peak value and the base value; and
   c) selecting the block width that corresponds to the peak ratio as an effective block width after post-compression image magnification.

8. A method as claimed in claim 1, for determining the zooming factor to which a compressed digital image has been applied, comprising the steps of:
   a) computing the average of the values in the column difference array that are separated by a hypothetical block width to produce a block averaged column difference array;
   b) repeating steps d)–h) in claim 1 for a predetermined series of hypothetical block width values to produce a series of ratios between the peak value and the base value;
   c) selecting the block width that corresponds to the peak ratio as an effective block width after post-compression image magnification; and
   d) determining a zooming factor to be the ratio between the effective block size and the original block size.

9. A computer program product for determining the extent of blocking artifacts in a digital image comprising: a computer readable storage medium having a computer program stored thereon for performing the steps of:
   a) forming a column difference image from the difference between columns in the digital image;
   b) averaging the values in the columns in the column difference image to produce a column difference array;

c) computing the average of the values in the column difference array that are separated by one block width to produce a block averaged column difference array;

d) locating a peak value in the block averaged column difference array;

e) calculating a mean value of the block averaged column difference array excluding the peak value to produce a column base value;

f) computing the ratio between the peak value and the column base value to produce a column ratio;

g) repeating steps a)–f) in the row direction to produce a row ratio; and;

h) employing the column and row ratios as a measure of the extent of blocking artifacts in the digital image.

* * * * *